United States Patent [19]

Brunn et al.

[11] 4,427,534

[45] Jan. 24, 1984

[54] PRODUCTION OF JET AND DIESEL FUELS FROM HIGHLY AROMATIC OILS

[75] Inventors: Louis W. Brunn, Cabot; Jaime Lopez, Pittsburgh, both of Pa.

[73] Assignee: Gulf Research & Development Company, Pittsburgh, Pa.

[21] Appl. No.: 385,287

[22] Filed: Jun. 4, 1982

[51] Int. Cl.$^3$ .............................................. C10G 45/50
[52] U.S. Cl. ............................................ 208/89; 585/270; 208/112; 208/111; 502/228; 502/229
[58] Field of Search .................. 208/111, 59; 252/441; 585/270; 208/112, 89

[56] References Cited

U.S. PATENT DOCUMENTS

| | | | |
|---|---|---|---|
| 2,956,002 | 10/1960 | Folkins | 208/59 |
| 3,078,238 | 2/1963 | Beuther et al. | 208/109 |
| 3,132,087 | 5/1964 | Kelley et al. | 208/60 |
| 3,147,210 | 9/1964 | Hass et al. | 208/310 |
| 3,203,889 | 8/1965 | Pollitzer et al. | 208/57 |
| 3,203,890 | 8/1965 | Haensel | 208/58 |
| 3,222,274 | 12/1965 | Carl | 208/143 |
| 3,223,652 | 12/1965 | Erickson et al. | 585/270 |
| 3,230,164 | 1/1966 | Williams et al. | 208/89 |
| 3,245,901 | 4/1966 | Beuther et al. | 208/110 |
| 3,424,673 | 1/1969 | Kirk, Jr. | 208/218 |
| 3,493,493 | 2/1970 | Henke et al. | 208/264 |
| 3,527,693 | 9/1970 | Barnes et al. | 208/57 |
| 3,594,307 | 7/1971 | Kirk, Jr. | 208/57 |
| 3,617,487 | 11/1971 | Jaffe | 208/111 |
| 3,640,818 | 2/1972 | Hamner | 208/65 |
| 3,642,611 | 2/1972 | Robertson et al. | 208/87 |
| 3,647,678 | 3/1972 | Egan | 208/59 |
| 3,671,419 | 6/1972 | Ireland et al. | 208/57 |
| 3,673,112 | 6/1972 | Levinson | 252/441 |
| 3,717,586 | 2/1973 | Suggitt et al. | 208/108 |
| 3,728,250 | 4/1973 | Hass et al. | 208/89 |
| 3,767,562 | 10/1973 | Sze et al. | 208/143 |
| 3,929,618 | 12/1975 | Abiko et al. | 208/111 |
| 3,952,069 | 4/1976 | Christman et al. | 585/270 |
| 3,985,638 | 10/1976 | Kirk, Jr. | 208/15 |
| 4,097,365 | 1/1978 | Ward | 208/111 |
| 4,162,961 | 7/1979 | Marmo | 208/57 |

*Primary Examiner*—Delbert E. Gantz
*Assistant Examiner*—Lance Johnson
*Attorney, Agent, or Firm*—Deanne E. Keith; Forrest D. Stine

[57] ABSTRACT

Highly aromatic hydrocarbon feedstocks are converted to jet fuel or diesel fuel using a sulfided, halogen promoted Group VIB - Group VIII metal on an alumina-containing support. The preferred catalyst is a presulfided, fluorine-promoted nickel-tungsten on silica-alumina catalyst wherein the nickel is present in amounts of between 18 and 22 weight percent based on the total catalyst weight.

29 Claims, 2 Drawing Figures

PRODUCTION OF JET AND DIESEL FUELS FROM HIGHLY AROMATIC OILS

FIELD OF THE INVENTION

The present invention relates to the production of jet fuels and diesel fuels by the hydrogenation/hydrocracking of highly aromatic and olefinic oils. More particularly, this invention relates to the manufacture of jet and diesel fuels by the catalytic conversion of cycle oils using a fluorine-promoted nickel-tungsten catalyst.

DESCRIPTION OF THE PRIOR ART

It is well known in the art that petroleum fractions can be hydrocracked to produce lower boiling hydrocarbons such as gasoline and/or jet fuels. Such hydrocracking operations have involved contacting higher boiling fractions at elevated temperature and pressure with hydrogen in the presence of a hydrogenation catalyst such as palladium, nickel, etc. composited with a cracking base. Such hydrocracking processes have been directed towards the formation of relatively large amounts of hydrocarbons boiling in the gasoline range. In some cases higher boiling materials such as middle oils, i.e., boiling above 250° F. and especially between about 400° and 650° F. are formed, and this portion of the product has been recycled with unconverted feedstock, while in other cases such portion of the product has been used as fuel oil, jet fuel, diesel fuel or the like.

The development of modern jet engines has resulted in various specifications for jet fuel relating to freezing point, stability, volatility, odor, corrosiveness and the like. In addition to such requirements, additional specifications have been set forth with respect to actual burning qualities, such as the smoke point. Thus, for example, Jet A specifications require a minimum smoke point of 20 millimeters. Similarly, diesel fuel specifications contain numerous requirements including a minimum Cetane Index of 43, which corresponds to a Cetane Number of 40.

In order to convert a highly aromatic feedstock into a suitable jet fuel or diesel fuel, the aromatics content of such feed must be reduced significantly, since the aromatic content has a direct relationship to the smoke point of jet fuels and the Cetane Index of diesel fuels. Thus, Jet A specifications require a maximum of 20 volume percent aromatics as well as a 20 millimeter minimum smoke point.

Prior proposals to convert a highly aromatic feedstock, such as a cycle oil into jet fuel or diesel fuel in a single step, for example, have been unsuccessful because such proposals have involved the use of catalysts and conditions which result in inadequate hydrogenation thus providing a product oil having too high an aromatics content to meet present jet or diesel fuel specifications. Thus, it has been proposed to reduce the aromatics content of such feed stocks by extraction with an aromatics selective solvent prior to hydrogenation.

SUMMARY OF THE INVENTION

It has now been found that jet fuel and diesel fuel can be produced from a highly aromatic hydrocarbon-containing feedstock by a process which comprises contacting hydrogen and the feed, such as a cycle oil, under hydrogenation/hydrocracking conditions with a presulfided catalyst comprising a Group VIB metal and a Group VIII metal composited on a cracking support, wherein the catalyst composite contains between about 18 to about 22 weight percent of a Group VIII metal based upon the total catalyst weight.

The preferred catalyst of the present invention is a presulfided, fluorine-promoted catalyst comprising nickel and tungsten on a silica-alumina support, wherein the catalyst composite comprises from about 18 to about 22 weight percent nickel. Such catalyst can be used alone when it is desired to substantially lower the boiling range of the feedstock, such as in the case of a jet fuel, or may be used in physical combination with a similar catalyst wherein an alumina support, e.g., gamma-alumina support is substituted for the silica-alumina support, when a lesser degree of hydrocracking is desired, as in the case of a diesel fuel. Surprisingly, it has been discovered that the use of such catalysts provides hydrogenation/hydrocracking activity which not only converts the highly aromatic cycle oil to materials boiling below the boiling range of the feedstock and within the desired boiling range of a jet fuel or a diesel fuel boiling close to the boiling range of the feed, but, in addition, serves to saturate the aromatics sufficiently to produce a product which has an acceptably low aromatic content and a sufficiently high smoke point to meet the Jet A specifications for a jet fuel. Similarly, such highly aromatic feedstock can be converted to a diesel fuel having the desired Cetane Number.

Thus, the catalyst of the present invention not only possesses adequate cracking activity to reduce the boiling range of the feedstock to the desired jet fuel or diesel fuel boiling range, but apparently provides a high degree of saturation of the aromatics in the feed wherein polynuclear condensed aromatics are converted to condensed naphthenes, followed by selective cracking of the condensed naphthenes to form alkyl naphthenes. Although it is not intended to limit the present invention to a particular theory or mechanism, it is believed that the polynuclear cyclic compounds present in the feed are attacked and the rings opened, but the alkyl side chains formed by opening the rings are not apparently further reacted to sever the resulting alkyl side chains.

In accordance with one embodiment of the present invention, the hydrogenation/hydrocracking process of the present invention is conducted in a single stage wherein a highly aromatic feedstock is converted to a jet fuel or diesel fuel.

In accordance with another embodiment of the present invention, a highly nitrogenous feedstock is subjected to a first denitrogenation stage for reduction of the nitrogen content of the feedstock to within predetermined amounts and the resulting stream is then passed to a second stage hydrogenation/hydrocracking process wherein the remaining nitrogen serves as a moderator to control the degree of hydrocracking in the second stage.

DESCRIPTION OF THE PREFERRED EMBODIMENTS

Figure 1:
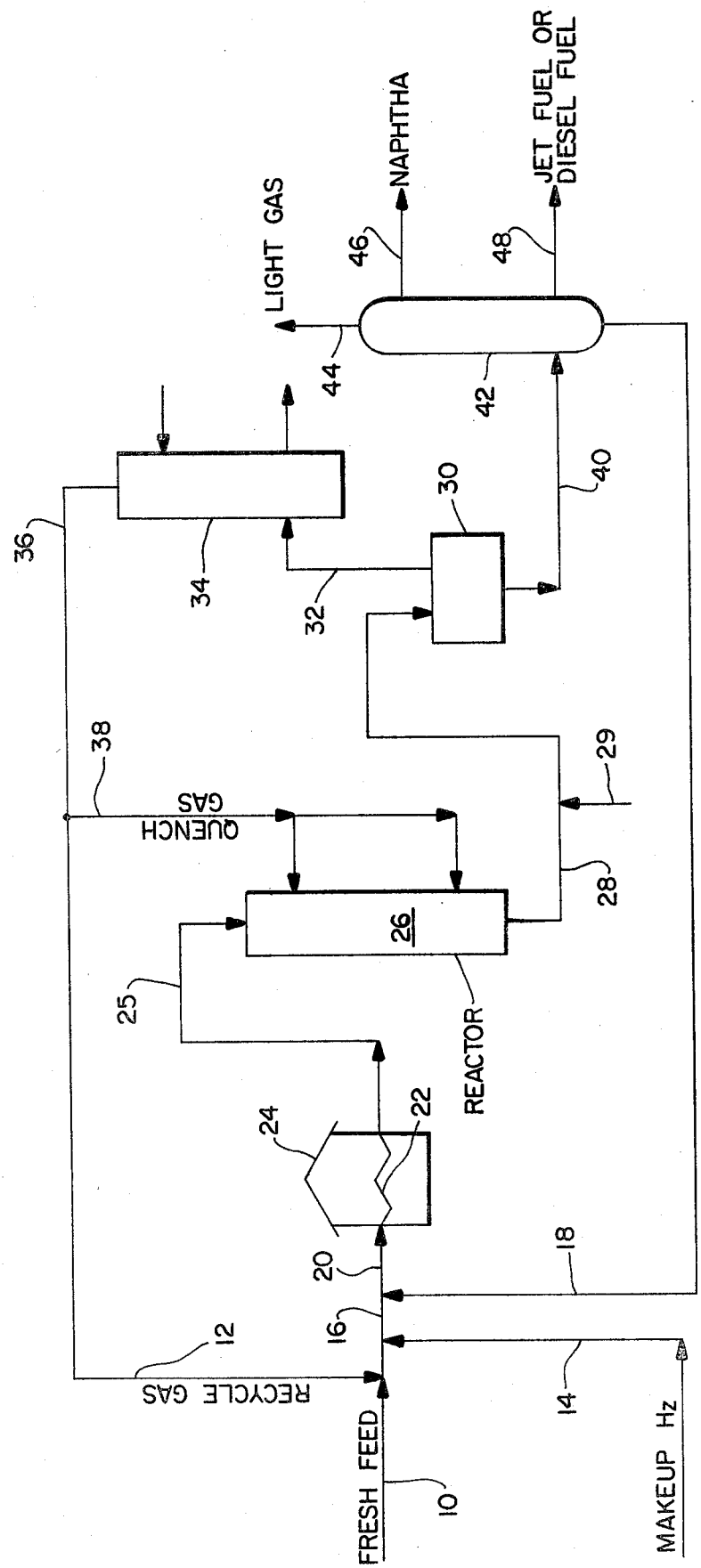
FIG. 1 is a schematic flow diagram of the single-stage hydrogenation/hydrocracking process for the production of jet fuel or diesel fuel from aromatic feedstocks in accordance with the invention.

As shown in the process set forth in FIG. 1 of the drawings, a highly aromatic feedstock is passed by means of line 10 along with recycle hydrogen from line 12, makeup hydrogen from line 14 and the admixture is passed by means of line 16 along with recycle oil from line 18 to line 20 from which the admixture is fed to preheater tube 22, which is disposed in furnace 24.

Feed stream 10 is any suitable aromatic hydrocarbon containing feedstock, which contains, for example up to 80–85 volume percent aromatics, such as a furnace oil or cycle oil containing at least 65 volume percent aromatics and obtained by the catalytic cracking of heavy petroleum fractions such as gas oils, employing either a synthetic or a natural zeolitic catalyst. For example, a suitable aromatics containing feedstock can have a boiling range of from about 320° to about 720° F. (160° to about 382° C.), preferably from about 400° to about 650° F. (204° to about 343° C.), and especially from about 420° to about 640° F. (216° to about 338° C.). Although the process of the present invention has particular utility for highly aromatic feedstocks containing in excess of 60 volume percent aromatics, for example, from about 60 to about 85 volume percent aromatics, the process of the present invention can be utilized for feedstocks containing as low as 30 to about 85 volume percent aromatics, if desired. The nitrogen content of the feed in line 10 should be a maximum of from about 700 to 800 ppm nitrogen, preferably from about 10 to about 150 ppm nitrogen.

The admixture is heated in furnace 24 as it passes through heating coil 22 and the heated admixture is passed to reactor 26 wherein the aromatic feedstock is subjected to a temperature in the range of 625° to about 800° F. (329° to about 427° C.), preferably from about 625° to about 725° F. (329° to about 385° C.). The hydrogen partial pressure in the reactor is between about 750 to about 2,000 pounds per square inch (52 to 140 kg/cm$^2$), preferably from about 1,000 to about 1,500 pounds per square inch (70 to 105 kg/cm$^2$). The liquid hourly space velocity for the hydrogenation/hydrocracking process (volume of liquid per hour per volume of catalyst) can range from 0.30 to about 2.0, preferably from about 0.5 to about 1.5. Hydrogen is utilized from about 500 to about 3,000 standard cubic feet per barrel, depending upon the feedstock being processed and the product required.

The catalyst utilized in reactor 26 comprises a presulfided Group VIB and Group VIII metals on a silica-alumina support. Preferably, the catalyst of the present invention is a presulfided, fluorine-promoted nickel-tungsten catalyst supported on a silica-alumina support, wherein the catalyst contains between about 18 and about 22 weight percent nickel, and especially about 20 weight percent nickel (determined as the metal) and from 18 to about 22 weight percent tungsten, with about 20 weight percent tungsten being especially preferred. Molybdenum can be substituted for tungsten, if desired in similar amounts. It is advantageous to add a halogen, preferably fluorine, to the catalyst prior to use. The halogen may be combined with the catalyst during preparation by means of a compound such as HF; NH$_4$F; NH$_4$F.HF; H$_2$SiF$_6$ or HBF$_4$, or corresponding or similar compounds of chlorine or bromine, such as hydrochloric acid, etc. About 0.1 to 5 weight percent halogen, preferably from about 1 to about 3 weight percent halogen is combined with the catalyst.

The nickel and tungsten components may be deposited in sequence on the silica-alumina carrier with, or without intervening drying and/or calcining. Simultaneously impregnation of the carrier from a two-component solution containing the two metals may also be employed, as for example, described in U.S. Pat. No. 2,703,789 to McKinley et al, which is hereby incorporated by reference. The preferred carrier is silica-alumina containing from about 65 to about 85 weight percent silica, preferably from about 70 to about 80 weight percent, and from 20 to about 30 weight percent, preferably from about 23 to about 28 weight percent alumina, based upon the weight of the unimpregnated silica-alumina catalyst. Other carriers in the form of refractory oxides can be used, such as silica-zirconia. Preferably, the silica-alumina is in amorphous form containing no crystals or crystallites. However, a crystalline alumino silicate carrier can be utilized, if desired.

Preferably, the catalyst is presulfided using any conventional sulfiding procedure using sulfur compounds, for example, compounds having a hydrogen-to-sulfur or a carbon-to-sulfur linkage such as dimethyl sulfide, butylmercaptan, thiophene, hydrogen sulfide, carbon disulfide, etc. can be added to the feed. Another means of sulfiding the catalyst composite of the present invention is by utilizing a mixture of 8 volume percent hydrogen sulfide and 92 volume percent hydrogen gas under conditions, for example, of 400° F. and 35 psig, while utilizing a flow rate and duration for the sulfiding step such that 0.025 standard cubic feet of hydrogen sulfide was contacted per cubic centimeter of catalyst. This is about twice that required to convert the nickel and tungsten oxides present in the catalyst to their respective completely sulfided forms (NiS$_2$ and WS$_3$). Thus, it has been found that an especially preferred form of the catalyst of the present invention is provided by presulfiding the catalyst composite with a sulfur providing compound in excess of that required to completely sulfide the Group VIB and Group VIII metals.

The effluent from hydrogenation/hydrocracking reactor 26 is passed by means of line 28, and water is added thereto by means of line 29 and the resulting stream is passed to a high pressure separator 30.

In separator 30, the hydrogen containing gas is separated from the effluent mixture and is passed by means of line 32 to an amine scrubber 34, wherein hydrogen sulfide is removed. A gas comprising hydrogen and some methane is withdrawn from the amine scrubber 34 by means of line 36. A portion of the hydrogen-containing gas can be utilized as quench in reactor 26 to control the exothermic heat of reaction by passing a portion of such gas by means of line 38 into reactor 26 as indicated. The remaining portion of the hydrogen-rich recycle gas is passed by means of line 12 for admixture with fresh feed in line 10 to reactor 26 as previously described.

Meanwhile, the effluent from high pressure separator 30 is passed by means of line 40 to fractionator 42. Although fractionator 42 is illustrated as a single unit, it should be understood that this is merely for illustrative purposes and that a series of vapor liquid fractionators and the like can be employed. Within fractionator 42, the feed thereto is separated into a light gas fraction which is withdrawn by means of line 44 and a naphtha fraction which is withdrawn by means of line 46. The jet fuel or diesel fuel product fraction is withdrawn by means of line 48, and the amount of such fraction, respectively, will depend upon the conditions used in reactor 26 including the type of catalysts employed. For example, if it is desired to produce predominantly jet fuel, then the catalyst utilized will comprise, for example, all or mostly a presulfided, fluorine-promoted nickel-tungsten on silica-alumina catalyst from between about 20 up to about 90 or 100 volume percent, and from about 0 or 10 up to about 80 volume percent of a presulfided, fluorine-promoted nickel-tungsten on alumina catalyst. Thus, a catalyst mixture comprising predominantly, if not all, of the silica-alumina supported catalyst of the present invention will serve to hydrocrack the aromatic-containing feedstock to the lower boiling range jet fuel, which, for example can have a boiling range of from about 300° or 320° F. to about 540° F. (149° or 160° to about 282° C.). On the other hand, if it is desired to produce a predominantly diesel fuel product, then a smaller portion of the silica-alumina supported catalyst from about 10 to 60 volume percent can be employed, with from about 40 to about 90 volume percent of the alumina supported catalyst of the present invention being utilized. Thus, in the case of diesel fuel, which has a higher boiling range of approximately 380° to about 650° F. as compared with the jet fuel, less hydrocracking is desired, as the diesel fuel boiling range is more nearly like the highly aromatic cycle oil feedstocks utilized in the present invention, which have, for example a boiling range of 420° to about 640° F. (216° to about 338° C.).

When treating a hydrocarbon feedstock boiling substantially in the product boiling range, it may be desired to utilize only the alumina-supported catalyst without any of the silica-alumina supported catalyst. Sufficient hydrocracking activity is imparted to the alumina-supported catalyst by the fluorine component in such case. Likewise, the alumina can be an activated alumina, which will provide limited cracking activity.

A bottoms fraction is withdrawn by means of line 18 from fractionation column 42 which is recycled to the reactor for further conversion to jet or diesel fuel. Typically, this bottoms fraction is comprised of a high percentage of saturated material as well as a lesser amount of aromatics, and thus can be further converted into additional jet or diesel fuel by recycle to reactor 26. Recycle of this material will further serve to raise the smoke point of the jet fuel and increase the Cetane Number of the diesel fuel.

Figure 2:
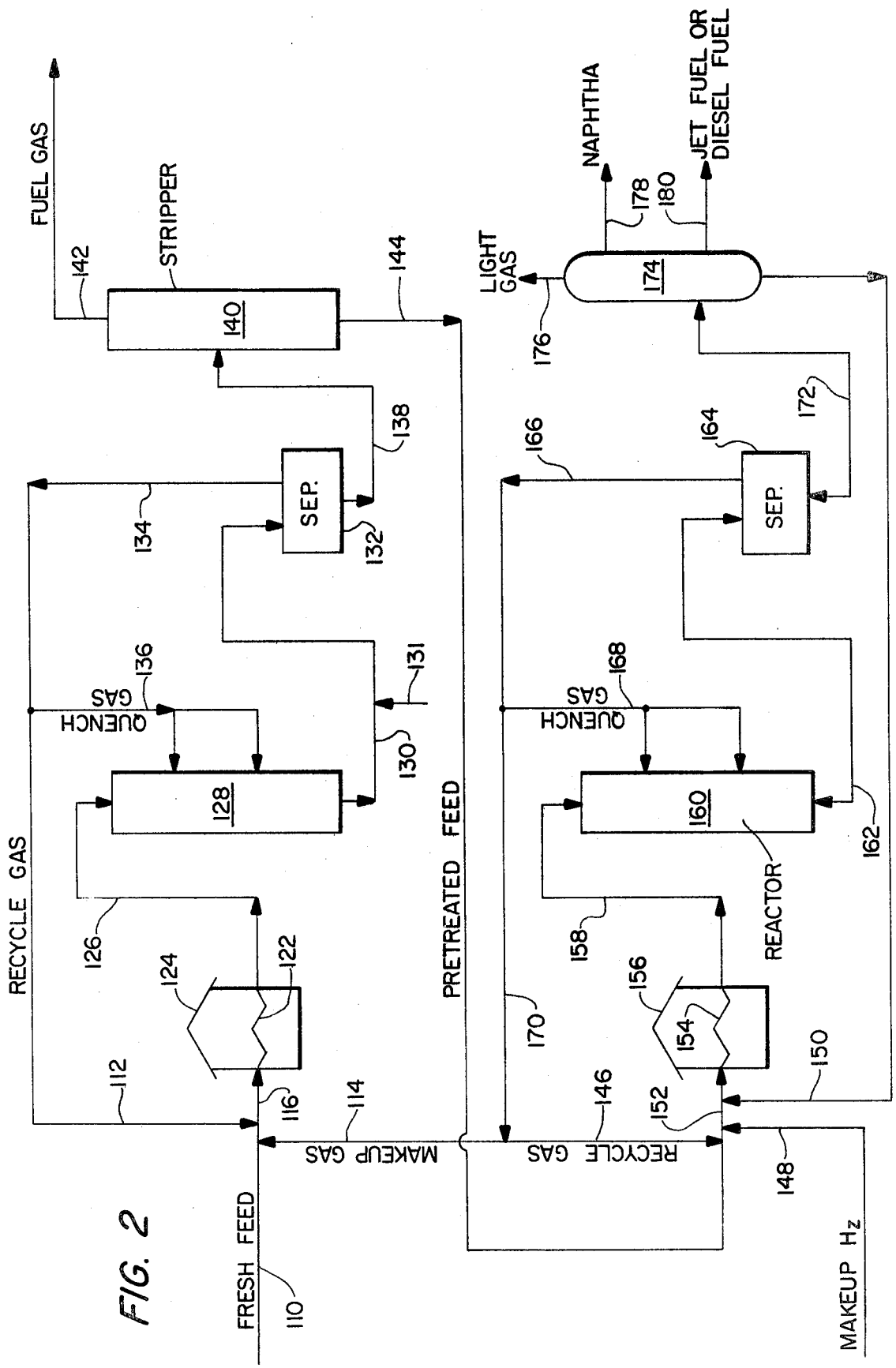
FIG. 2 is a schematic flow diagram of a two-stage process of the present invention for control of the nitrogen content of the feed to the hydrogenation/hydrocracking stage.

Referring now to FIG. 2, a two-stage process is illustrated in which the first stage is utilized for reducing the nitrogen content of the feed to a predetermined level prior to the hydrogenation/hydrocracking operation. Thus, as shown in FIG. 2, fresh feed is introduced by means of line 110, admixed with recycle hydrogen from line 112 and makeup hydrogen from line 114, and the admixture in line 116 is passed to coil 122 disposed in furnace 124. The heated admixture is passed by means of line 126 to denitrogenation reactor 128. In denitrogenation reactor 128, the highly aromatic feedstock containing, for example, 350 ppm nitrogen or more is contacted with a hydrogenation catalyst such as a presulfided catalyst comprising between about 2 and about 8, preferably between about 4 and about 7 weight percent of nickel, between from about 8 and about 25, preferably between about 12 to about 20 weight percent of tungsten or molybdenum, and preferably between about 1 to about 5, especially between about 2 to about 3.5 weight percent of fluorine, based upon the total catalyst composite.

Any suitable support for the denitrogenation catalyst may be employed including a silica-alumina or silica-zirconia support. Preferably, the hydrogenating components are composited with a porous alumina support shaped in the form of granules, pellets, balls or extrudate, prior to compositing the hydrogenating materials therewith. The catalyst can be prepared in any suitable manner including that described in U.S. Pat. No. 4,162,961 to Marmo, which is hereby incorporated by reference. Suitable denitrogenation conditions in reactor 128 include a temperature in the range of between about 600° to about 800° F., preferably from about 620° to about 750° F. (327° to about 399° C.), while employing a hydrogen partial pressure in the range of from about 700 to about 1200 pounds per square inch (49 to about 84 kg/cm$^2$), preferably from about 800 to about 1100 pounds per square inch (56 to 77 kg/cm$^2$). The gas circulation rate can be between about 2,000 to about 10,000 standard cubic feet per barrel of gas (356 and 1781 cubic meters/cubic meter), generally, or preferably between about 3,000 and about 7,500 standard cubic feet per barrel of gas, preferably containing 75% or more of hydrogen. The liquid hourly space velocity can be between about 0.5 to about 2.5, preferably between about 0.8 to about 1.25 volumes of oil per volume of catalyst per hour, depending upon the degree of denitrogenation required.

The denitrogenated effluent is withdrawn from reactor 128 by means of line 130, and the denitrogenated stream contains from about 10 to about 150 ppm of nitrogen, preferably from about 10 to about 50 ppm nitrogen. It has been found that it is undesirable to lower the nitrogen content of the feed to the hydrogenation/hydrocracking reactor to below 10 ppm nitrogen, since the nitrogen serves to prevent overcracking of the feed to the hydrogenation/hydrocracking reaction resulting in undesirable amounts of lower molecular weight hydrocarbons.

The effluent from the denitrogenation reactor 128 containing approximately 10 to 50, preferably 10 to 20 ppm nitrogen is withdrawn by means of line 130 and passed to separator 132 wherein a recycle gas rich in hydrogen is withdrawn by means of line 134 and utilized as quench in denitrogenation reactor 128, as required. For this purpose, a portion of the hydrogen-rich gas in line 134 is passed by means of line 136 to reactor 128. The remaining portion of the hydrogen-rich gas in line 134 is passed by means of line 112 for admixture with fresh feed in line 110 and passage to reactor 128. In separator 132, the converted nitrogen compounds are removed as NH$_3$ in an aqueous phase that is continuously withdrawn, water being added to line 131. The remaining effluent from separator 132 is passed by means of line 138 to stripper 140, wherein dissolved NH$_3$, H$_2$S and light hydrocarbon gases are separated from a pretreated liquid feed. The gases are removed overhead by means of line 142, and the pretreated feed is passed by means of line 144 for admixture with recycle hydrogen from line 146, makeup hydrogen in line 148, and recycle liquid in line 150. The resultant admixture in line 152 is passed by means of coil 154 in furnace 156 via line 158 to hydrogenation/hydrocracking reactor 160 as previously described in connection with FIG. 1.

A reduced aromatic effluent is withdrawn from reactor 160 by means of line 162 and passed to high pressure separator 164 as previously described. Recycle hydrogen is passed by means of line 166 to line 168 for quench, as required, and the remainder is passed by means of lines 170 and 146 for recycle to the reactor. The effluent from separator 164 is passed by means of line 172 to fractionator 174 wherein it is fractionated into a light gas fraction withdrawn by means of line 176, a naphtha fraction withdrawn by means of line 178 and a jet or diesel production fraction withdrawn by means of line 180. A bottoms fraction boiling above 540° F. (jet fuel case) or 650° F. (diesel case) is withdrawn from the bottom of fractionator 174 by means of line 150. This bottoms fraction, containing highly saturated materials, is converted to further fuel product by recycle to reactor 160 as described in connection with FIG. 1.

The following examples illustrate the present invention and are not intended to limit the invention, but rather, are presented for the purposes of illustration.

EXAMPLE 1

In order to demonstrate the process of the present invention or the production of jet fuel, a two-stage operation similar to that depicted in FIG. 2 of the drawings is conducted using as feed a light catalytic gas oil which was subjected to a denitrogenation reactor temperature of 630° F. (332° C.) and a hydrogen partial pressure of 900 psia (63 kg/cm$^2$), while using a space velocity of 1.0 LHSV while being passed over a catalyst comprising 6 weight percent nickel, 19 weight percent tungsten and 2 percent fluorine supported on a silica-alumina support to provide a feed having the following inspections.

TABLE I

| | |
|---|---|
| Gravity: °API (ASTM D-287) | 26.8 |
| Distillation: °F. (ASTM D-86) | |
| IBP | 386 |
| 5% | 422 |
| 10 | 440 |
| 30 | 472 |
| 50 | 495 |
| 70 | 527 |
| 90 | 580 |
| 95 | 605 |
| EP | 644 |
| Sulfur: (Wt. %) | 0.25[1] |
| Nitrogen: ppm | 1 |
| Aromatics: (Vol. %) | 66.5 |

[1]After addition of 1500 ppm S (0.15 wt %) as dimethylsulfide.

The denitrogenated feed and hydrogen were contacted in a first test with a dual catalyst system comprising 60 volume percent of a catalyst comprising 20 weight percent nickel, 20 weight percent tungsten, and 2% fluorine supported on gamma-alumina positioned at the top of the bed above a second catalyst comprising 40 volume percent of a catalyst composite comprising 20 weight percent nickel, 20 weight percent tungsten, and 2% fluorine on a silica-alumina support provided in the lower portion of the bed. The catalyst system had been presulfided by adding 4000 ppm sulfur as dimethyl sulfide to the raw LCGO (light catalytic gas oil) feed.

The highly aromatic denitrogenated feed is passed over the dual catalyst system at an average reactor temperature of 650° F. (343° C.) using 10,000 standard cubic feet per barrel (1780 cubic meters/cubic meter) of a gas containing 78% hydrogen. The total reactor pressure is 1500 psig (106 kg/cm$^2$) and a liquid hourly space velocity of 0.69 volumes/hour/volume was used.

The foregoing procedure was repeated in a second test using the same feedstock and conditions, except that the feed was spiked with 50 ppm nitrogen as aniline to determine the effect of an increased amount of nitrogen on the system, and the average reactor temperature was increased to 675° F. (357° C.). The results of both tests are set forth in the following table:

TABLE II

| | Two Stage Operation | |
|---|---|---|
| Test | 1 | 2 |
| Nitrogen: ppm | | |
| Yields: Vol. % | 1 | 50 |
| Naphtha, (C$_5$ - 300 F.) | 40.2 | 6.1 |
| Jet Fuel (300–530 F.) | 59.5 | 85.4 |
| Bottoms (530 F.+) | 7.4 | 20.7 |
| Jet Fuel Inspections | | |
| °API (ASTM D-287) | 39.9 | 36.7 |
| Distillation: °F. (ASTM D-86) | | |
| IBP | 332 | 309 |
| 5% | 352 | 355 |
| 10 | 360 | 373 |
| 30 | 382 | 418 |
| 50 | 409 | 441 |
| 70 | 436 | 461 |
| 90 | 472 | 488 |
| 95 | 486 | 500 |
| EP | 528 | 531 |
| Freeze Point: °F. | −53 | −54 |
| Smoke Point: mm | 21 | 19 |
| Luminometer Number | 44 | — |
| Aromatics (FIA): Vol % | 14.0 | 14.5 |
| Naphthalenes, D1840 | 0.06 | 0.08 |

As seen in Table II, test 1 indicates that a jet fuel was produced meeting Jet A specifications in that it has a smoke point of 21 millimeters and an aromatic content less than 20 volume percent. Additionally, as seen in test 2, wherein the nitrogen content of the feed to the second stage was increased, the nitrogen prevented overcracking and thus increased the yield of jet fuel from 59.5 volume percent to 85.4 volume percent.

EXAMPLE 2

This example illustrates a single stage operation of the present invention.

In this test, the dual catalyst system of the previous example is employed and is presulfided with 4000 ppm sulfur in the form of dimethyl sulfide at 450° F. (232° C.) under a pressure of 1500 psig (106 kg/cm$^2$) using a LCGO liquid hourly space velocity of 1.0.

The feed to the reactor in this test had the following inspection:

TABLE III

| | |
|---|---|
| Gravity: °API | 19.8 |
| Distillation: °F. | |
| IBP | 420 |
| 5% | 450 |
| 10 | 464 |
| 30 | 492 |
| 50 | 517 |
| 70 | 550 |
| 90 | 604 |
| 95 | 622 |
| EP | 640 |
| Sulfur: (Wt. %) | 1.41 |
| Nitrogen: ppm | 350 |
| Aromatics: (Vol. %) | 71.5 |

The foregoing feed was used in an amount of 70 volume percent in a blend with 30 volume percent distillate as feed to the reactor. The hydrogenation/hydrocracking reactions are conducted at a temperature of 710° F. (377° C.) under a total reactor pressure of 1500 psig (106 kg/cm$^2$) using 15000 standard cubic feet per barrel (2670 cubic meters/cubic meter) of a gas comprising 78% hydrogen. The yields and jet fuel inspections are set forth in the following table:

TABLE IV

| Single Stage Operation | |
|---|---|
| Test | |
| Nitrogen: ppm | 230 |
| Yields: Vol. % | |
| Naphtha, (c5 - 300 F.) | 12.5 |
| Jet Fuel (300-540 F.) | 77.4 |
| Bottoms (540 F.+) | 19.2 |
| Jet Fuel Inspections | |
| °API (ASTM D-287) | 39.3 |
| Distillation: °F. (ASTM D-86) | |
| IBP | 288 |
| 5% | 332 |
| 10 | 353 |
| 30 | 398 |
| 50 | 432 |
| 70 | 457 |
| 90 | 483 |
| 95 | 497 |
| EP | 516 |
| Freeze Point: °F. | −44 |
| Smoke Point: mm | 19 |
| Luminometer Number | 37 |
| Aromatics (FIA): Vol % | 18.0 |
| Naphthalenes, D1840 | 0.28 |

As seen in Table IV, the aromatics content of the feed was reduced sufficiently to comply with jet fuel specifications. In addition, the corrosion and stability specifications were achieved. The desired smoke point can be easily achieved in this single stage operation by using recycle. The single-pass yield of jet fuel was 77.4 volume percent.

EXAMPLE 3

This example demonstrates the production of diesel fuel using the process of the present invention.

The highly aromatic gas oil of Table III is passed over the dual catalyst of the previous examples at a liquid hourly space velocity of 0.67 at an average reactor temperature of 700° F. (371° C.) under a total reactor pressure of 1500 psig (106 kg/cm$^2$) using 12,000 standard cubic feet per barrel (2136 cubic meters/cubic meter) of a gas comprising 78% hydrogen. A second test was conducted at a liquid hourly space velocity of 0.45 and with 10,000 standard cubic feet per barrel (1780 cubic meters/cubic meter) of the aforesaid hydrogen-containing gas being utilized.

The product inspections are set forth in the following table:

TABLE V

| Test | 1 | 2 |
|---|---|---|
| Gravity: °API | 36.9 | 37.7 |
| Sulfur: (Wt. %) | 0.01 | 0.02 |
| Nitrogen: ppm | 0.3 | 0.2 |
| Aromatics: (Vol. %) | 21.5 | 14.5 |
| Distillation: °F. | | |
| IBP | 243 | 246 |
| 5% | 294 | 299 |
| 10 | 338 | 345 |
| 30 | 419 | 421 |
| 50 | 457 | 454 |
| 70 | 486 | 482 |
| 90 | 543 | 540 |
| 95 | 567 | 568 |
| EP | 609 | 611 |
| Cetane Index | 43.9 | 45.0 |

As seen in Table V, a good diesel fuel is produced having a Cetane Index of 43.9 and 45.0, respectively.

EXAMPLE 4

This example illustrates that the catalyst of the present invention is significantly more active for saturating the aromatics present in a highly aromatic feedstock than is the identical catalyst but with a lower nickel content.

In a first test, a feed is utilized having the following inspection:

TABLE VI

| Gravity: °API | 19.9 |
|---|---|
| Sulfur: ppm | 5100 |
| Nitrogen, Chemilum G1646: ppm | 570 |
| Doctor Test, FTMS-791-5203 | — |
| Hydrocarbon Analysis | |
| FIA, D1319, Vol % | |
| Saturates | 28.0 |
| Olefins | 2.5 |
| Aromatics | 69.5 |
| Bromine No., D1159 | 6.7 |
| Cetane Index | 19.6 |
| ASTM Color, D1500 | <8.0 |
| Distillation, °F., D86 | |
| OP | 381 |
| EP | 649 |
| 10% | 452 |
| 30% | 499 |
| 50% | 530 |
| 70% | 559 |
| 90% | 610 |

The feed is passed with hydrogen over a presulfided catalyst comprising 20 weight percent nickel, 20 weight percent tungsten, 2 weight percent fluorine supported on silica-alumina. The feedstock is passed over the catalyst at a pressure of 1200 psig (84 kg/cm$^2$), a liquid hourly space velocity of 1.0 volume/hour/volume and a gas circulation rate of 6,898 standard cubic feet per barrel (1229 cubic meters/cubic meter) of pure hydrogen. The reactor is controlled to maintain a product Cetane Index of 33. Using this catalyst (catalyst A), the reactor temperature is measured to determine the temperature required to maintain a Cetane Index of 33.

A second test is conducted using a catalyst (catalyst B) which is identical to that of catalyst A except that catalyst B contains only 6 weight percent nickel based upon the total catalyst weight. Once again, the test is conducted under the aforesaid conditions and the temperature required to upgrade the feed to a product Cetane Index of 33 is recorded.

The results are set forth below in Table VII:

TABLE VII

| Test No. | 1 | 2 |
|---|---|---|
| Catalyst | Cat. A | Cat. B |
| Temperature | 600° F. | 651° F. |
| | (316° C.) | (344° C.) |
| Product Inspections | | |
| Gravity: °API | 27.3 | 28.3 |
| Sulfur: ppm | 341 | 216 |
| Nitrogen, Chemilum G1646 = ppm | 0.3 | 0.9 |
| Doctor Test, FTMS-791-5203 | Neg | Neg |
| Hydrocarbon Analysis | | |
| FIA, D1319, Vol % | | |
| Saturates | 45.5 | 48.0 |
| Olefins | 1.0 | 0.5 |
| Aromatics | 53.5 | 51.5 |
| Bromine No., D1159 | 5.0 | 1.5 |
| Cetane Index | 33.0 | 33.4 |
| ASTM Color, D1500 | L1.0 | L1.5 |

TABLE VII-continued

| Test No. | 1 | 2 |
|---|---|---|
| Distillation: °F., D86 | | |
| OP | 371 | 359 |
| EP | 671 | 675 |
| 10% | 444 | 436 |
| 30% | 481 | 471 |
| 50% | 505 | 495 |
| 70% | 546 | 541 |
| 90% | 613 | 613 |

The catalyst of the present invention, namely, catalyst A displayed a much greater activity for producing the Cetane Index of 33, than did catalyst B, which has a lower nickel content. Thus, catalyst A possesses approximately a 50° F. (28° C.) activity advantage of 600° F. over the 651° F. required for catalyst B.

What is claimed is:

1. A process for the production of a jet or diesel fuel from an aromatics-containing feedstock, which comprises contacting hydrogen and a feedstock containing at least 60 volume percent aromatics with a presulfided catalyst composite comprising a Group VIB metal, a Group VIII metal and a halogen impregnated on a cracking support under hydrogenation/hydrocracking conditions in a hydrogenation/hydrocracking reaction zone, said catalyst composite comprising from 18 to about 22 weight percent of said Group VIII metal based upon said total catalyst weight.

2. The process of claim 1 wherein said catalyst comprises a fluorine-promoted nickel-tungsten catalyst.

3. The process of claim 2 wherein said support is a silica-alumina support containing from 65 to about 85 weight percent silica.

4. The process of claim 1 wherein said catalyst comprises from about 18 to about 22 weight percent tungsten.

5. The process of claim 1 wherein said feedstock contains from about 60 to about 85 volume percent aromatics.

6. The process of claim 5 wherein said feedstock is a cycle oil.

7. The process of claim 1 wherein said catalyst is utilized in physical admixture with a catalyst comprising a Group VIB metal, a Group VIII metal and a halogen on an alumina support.

8. The process of claim 7 wherein said admixture comprises from about 10 to about 90 volume percent of said alumina-supported catalyst.

9. The process of claim 7 wherein said admixture comprises from about 10 to about 80 volume percent of said alumina-supported catalyst.

10. The process of claim 7 wherein said alumina supported catalyst comprises a fluorine-promoted nickel-tungsten catalyst.

11. The process of claim 10 wherein said catalyst comprises from about 18 to about 22 weight percent nickel, from about 18 to about 22 weight percent tungsten on a gamma-alumina support.

12. The process of claim 1 wherein said feed is first passed to a denitrogenation stage for reduction of the nitrogen content to between about 10 and about 20 ppm nitrogen.

13. The process of claim 1 wherein a hydrocarbon product is produced and separated into a jet fuel fraction and a higher boiling fraction which is recycled to the hydrogenation/hydrocracking reaction zone.

14. The process of claim 1 wherein a hydrocarbon fraction is produced and separated into a diesel fuel fraction and a higher boiling fraction, and recycling the higher boiling fraction of the hydrogenation/hydrocracking reaction zone.

15. The process of claim 1 wherein said catalyst is presulfided by contacting said catalyst composite with hydrogen sulfide or an organic sulfide in excess of that required to completely sulfide the Group VI and Group VIII metals to their sulfided forms.

16. A process for the production of a jet or diesel fuel from an aromatics-containing feedstock, which comprises contacting hydrogen and a feedstock containing at least 60 volume percent aromatics with a presulfided catalyst composite comprising a Group VIB metal, a Group VIII metal and a halogen impregnated on an alumina support under hydrogenation/hydrocracking conditions, said catalyst composite comprising from 18 to about 22 weight percent of said Group VIII metal based upon said total catalyst weight.

17. The process of claim 16 wherein said catalyst comprises a fluorine-promoted nickel-tungsten catalyst supported on alumina.

18. The process of claim 16 wherein said support is a gamma-alumina support.

19. The process of claim 3 wherein said silica-alumina is in amorphous form and contains no crystals or crystallites.

20. The process of claim 1 wherein said feedstock contains from about 10 to about 150 ppm nitrogen.

21. The process of claim 1 wherein the effluent from said reaction zone contains less than 20 volume percent aromatics.

22. The process of claim 1 wherein the effluent from said reaction zone contains not more than 21.5 volume percent aromatics.

23. The process of claim 1 wherein said catalyst comprises from about 0.1 to 5 weight percent halogen.

24. The process of claim 23 wherein said catalyst contains from about 1 to about 3 weight percent halogen.

25. The process of claim 24 wherein said halogen is fluorine.

26. A process for the production of a jet or diesel fuel from an aromatics-containing feedstock which comprises contacting hydrogen and a cycle oil feedstock containing from about 60 to about 85 volume percent aromatics with a presulfided catalyst composite comprising fluorine-promoted nickel-tungsten impregnated on a silica-alumina support, said support containing from about 65 to about 85 weight percent silica, said support being in amorphous form containing no crystals or crystallites, under hydrogenation/hydrocracking conditions in a hydrogenation/hydrocracking reaction zone at a temperature in the range of 625° to about 800° F. under a hydrogen partial pressure of between about 750 to about 2000 pounds per square inch, said catalyst composite comprising from 18 to about 22 weight percent nickel, from about 18 to about 22 weight percent tungsten and from about 0.1 to 5 weight percent fluorine based upon the total weight of said catalyst.

27. The process of claim 26 wherein said feed is first passed to a denitrogenation stage for reduction of the nitrogen content to between about 10 and about 20 ppm nitrogen.

28. The process of claim 26 wherein a hydrocarbon product is produced and separated into a jet fuel fraction and a higher boiling fraction which is recycled to the hydrogenation/hydrocracking reaction zone.

29. The process of claim 26 wherein a hydrocarbon fraction is produced and separated into a diesel fuel fraction and a higher boiling fraction, and recycling the higher boiling fraction to the hydrogenation/hydrocracking reaction zone.

* * * * *